United States Patent [19]

Hedgcock

[11] 4,129,204

[45] Dec. 12, 1978

[54] SPRING OPERATED CLUTCH WITH SMALL AND LARGE BOLTS

[75] Inventor: Richard L. Hedgcock, East Peoria, Ill.

[73] Assignee: Caterpillar Tractor Co., Peoria, Ill.

[21] Appl. No.: 820,174

[22] Filed: Jul. 29, 1977

[51] Int. Cl.² .................. F16D 13/44; F16D 13/72
[52] U.S. Cl. .................. 192/89 B; 192/70.27; 192/18 A; 188/170; 192/113 B; 267/162
[58] Field of Search .......... 192/89 B, 70.27, 91 A, 192/18 A, 89 R, 70.29; 188/166, 170; 64/30 R; 267/104, 105, 162

[56] References Cited

U.S. PATENT DOCUMENTS

| | | | |
|---|---|---|---|
| 3,557,913 | 1/1971 | Russler | 188/170 X |
| 3,831,718 | 8/1974 | Muller et al. | 188/170 X |
| 4,067,427 | 1/1978 | Cackley | 192/18 A |

*Primary Examiner*—Benjamin W. Wyche
*Attorney, Agent, or Firm*—Wegner, Stellman, McCord, Wiles & Wood

[57] ABSTRACT

A steering clutch and brake power drive assembly wherein a clutch pack and a brake pack formed of a plurality of facially engageable plates are respectively retained between a retaining plate and a housing portion of the assembly by a plurality of bolts which, in the assembled arrangement, provide a preselected stress in biasing springs acting on the clutch plates and brake plates, respectively. A novel arrangement of bolts is provided wherein different size bolts are utilized for facilitating the assembly and disassembly. A small number of the bolts is made to be sufficiently large so that the assembly may be maintained by a single one thereof notwithstanding a high biasing force generated by the spring in the assembled arrangement. An improved lubrication oil transfer structure is further provided to the plate stack from a pressurized oil supply defined by a lubricating oil cavity adjacent the plate stack. Relatively movable wall portions defining the cavity are effectively sealed to cause substantially all of the oil delivery to the plate stack to be through the transfer passages.

12 Claims, 4 Drawing Figures

SPRING OPERATED CLUTCH WITH SMALL AND LARGE BOLTS

BACKGROUND OF THE INVENTION

1. Field of the Invention

This invention relates to power drive assemblies and in particular to means for effecting facilitated assembly and disassembly of such power drive assemblies and means for affording improved lubrication of stacked plate means therein.

2. Description of the Prior Art

In one conventional form of power drive assembly, a steering clutch and brake means is provided for use in controlling the driving of a vehicle or the like. Each of the steering clutch and brake is defined by a pack of plates which are biased by a relatively strong spring. One form of spring which may be used for this purpose comprises a Belleville spring made up of a plurality of spring elements.

The clutch pack or brake pack may be installed in a suitable housing portion of the drive assembly by firstly dropping in the spring elements and then dropping in the reassembled clutch or brake pack. The clutch or brake pack is then retained in association with the housing element by a retaining ring secured to the housing member by a plurality of bolts. The retaining ring is drawn to the housing by the threaded tightening of the bolts against the biasing action of the spring which may generate a substantial force in the assembled arrangement.

To provide cooling lubrication of the plates during operation of the power drive, it is desirable to provide a flow of lubricating coolant thereto from a suitable pressurized source. It has been conventional to provide the flow of coolant to the stacked plates through a clearance between relatively movable wall portions of the assembly. In one form of such an assembly, the movable wall portions define concentrically overlapping portions With the flow passage for the lubricant extending between the overlapping portions.

SUMMARY OF THE INVENTION

The present invention comprehends an improved power drive assembly having improved means for securing the retaining plates to the housing portion mounting the drive pack. The drive pack may comprise either a clutch pack or a brake pack, as desired, with the retaining means functioning similarly in connection with either of these packs.

More specifically, the invention comprehends providing such a power drive assembly wherein the housing defines a first wall member and the retaining plate defines a second wall member with the pack including a plurality of facially engageable plates and a biasing spring being disposed in series between the wall members. The invention comprehends providing an improved securing means which includes a plurality of first bolts removably securing the second wall member to the first wall member with the strength of the bolts individually being less than required to hold the wall members in the assembled arrangement against the biasing action of the spring. A stronger, second bolt is also provided for securing the second wall member to the first wall member, the strength of the second bolt being substantially greater than that of the first bolts individually and sufficient to hold the wall members in the assembled arrangement against the biasing action of the spring. The second bolt preferably has a different head size as compared to the head size of the first bolt to provide an indication to the user of the difference therebetween and that the large bolt should be the last to remove during a disassembly operation.

The larger number of first bolts permits the first bolts to carry a major portion of the load in securing the second wall member to the first wall member although individually the first bolts have a lesser size and strength.

In the illustrated embodiment, a spacer ring is provided between the retaining ring and the housing wall member for accurately securing the pack in association with the spring in the assembly. In the illustrated embodiment, a plurality of smaller bolts is provided for securing the retaining ring to the spacer ring.

The first and second bolts may extend through the spacer ring and, thus, further serve to retain the retaining ring in assembled relationship with the spacer ring as well as with the housing wall member.

In the illustrated embodiment, the bolts are arranged in an annular configuration in an equiangular disposition. More specifically, in the illustrated embodiment, a total of 21 bolts is provided including 15 of the first medium size bolts, 3 of the large bolts and 3 of the small bolts. Thus, the bolts are arranged to have an 17° angular separation with the three large bolts being spaced 120° apart and the three small bolts being spaced 120° apart intermediate the three large bolts, and with the medium size bolts interspersed between the large and small bolts.

The invention further comprehends an improved means for providing coolant lubricant to the pack during operation of the power drive.

More specifically, the invention comprehends providing such a power drive assembly having a pack of facially engageable annular plates, annular wall means defining a chamber receiving the pack, and an annular piston movably engageable with the pack for selectively urging the plate into facial engagement. The wall means includes a rotatable carrier movably carrying the plates and a coaxially rotatable cylinder portion movably carrying the piston. The carrier and piston define a lubricating oil cavity for receiving pressurized lubricating oil and means are provided in the carrier defining a plurality of oil transfer passages communicating between the lubricating oil cavity and the pack chamber for conducting lubricating oil to the pack plates. Seal means are provided for removably sealing the carrier to the cylinder portion to cause lubricating oil to flow from the lubricating oil cavity to the pack chamber only through the transfer passages.

The transfer passages may comprise radial passages.

The carrier and cylinder portion may define overlapped portions of the assembly with the seal means extending radially therebetween.

The transfer passages may comprise relatively large cross section passages providing substantially free lubricating oil flow therethrough to the chamber for effectively maximized bathing of the plates in the chamber during use.

The carrier may define a plurality of axially parallel, circumferentially spaced splines with the transfer passages opening to the chamber between the splines.

In the illustrated embodiment, the seal is carried by the cylinder and projects radially into sealing engagement with the confronting surface of the carrier.

Thus, the power drive assembly of the present invention is extremely simple and economical of construction while yet providing the highly desirable improved functioning and features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
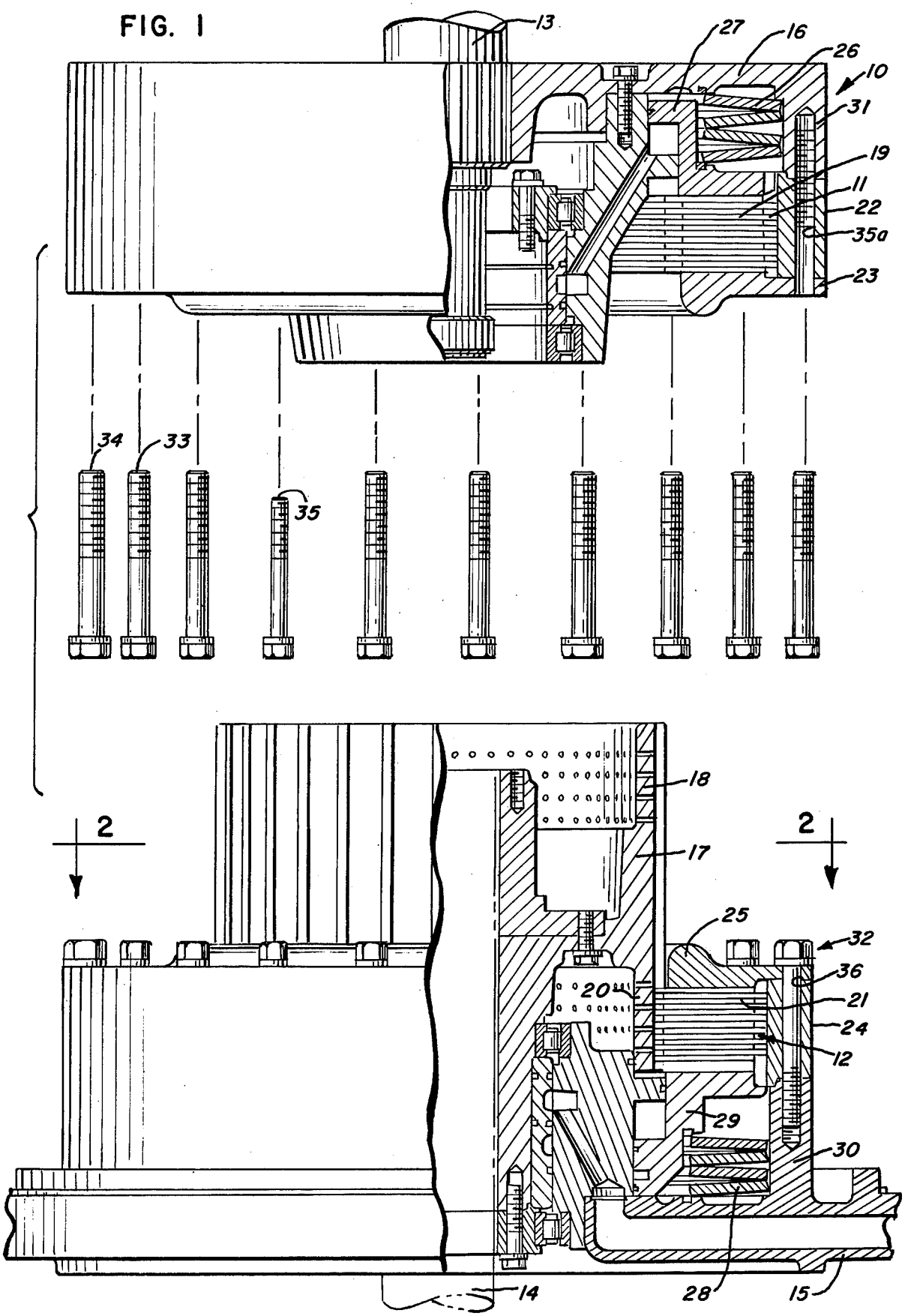
FIG. 1 is a diametric section of a power drive assembly having improved securing means and coolant lubricant providing means emboding the invention.

In the exemplary embodiment of the invention as disclosed in the drawing, a steering clutch and brake power drive assembly generally designated 10 is shown to include a clutch pack mechanism 11 and a brake pack mechanism 12. The assembly is driven from an input shaft 13 which may be rotated by a prime mover, such as the engine of a tractor vehicle. The output of the drive assembly is through an output shaft 14 which may be connected to the vehicle wheels or track with steering control thereof being effected by suitable operation of the assembly 10.

More specifically, the brake assembly may include a first wall member 15 defining a fixed housing member, which may be secured to the vehicle frame or other fixed vehicle support (not shown), as desired. The input shaft is connected to a second wall member 16 defining a housing receiving the clutch pack 11.

Driving connection is provided between the clutch pack 11 and brake pack 12 by means of a carrier 17 having a first portion 18 splined to a plurality of clutch plates 19, and a second portion 20 splined to a plurality of brake plates 21.

Clutch pack plates 19 are, in turn, splined to a spacer 22 secured between the wall member 16 and a retaining ring 23. Brake plates 21 are splined to a similar spacer 24 secured to the wall member 15 by a retaining ring 25.

As further shown in FIG. 1, the clutch pack assembly includes a biasing spring 26 acting between wall member 16 and a piston 27 urged by the spring against the clutch pack 11. A similar biasing spring 28 acts against the wall member 15 to bias a piston 29 against the brake pack 12.

As shown in FIG. 1, wall member 15 includes an annular flange portion 30 radially inwardly receiving the spring 28. Similarly, wall member 16 defines a flange 31 radially inwardly receiving the spring 26. Retaining ring 25 and spacer 24 are secured to flange 30 and retaining ring 23 and spacer 22 are secured to flange 31.

Figure 2:
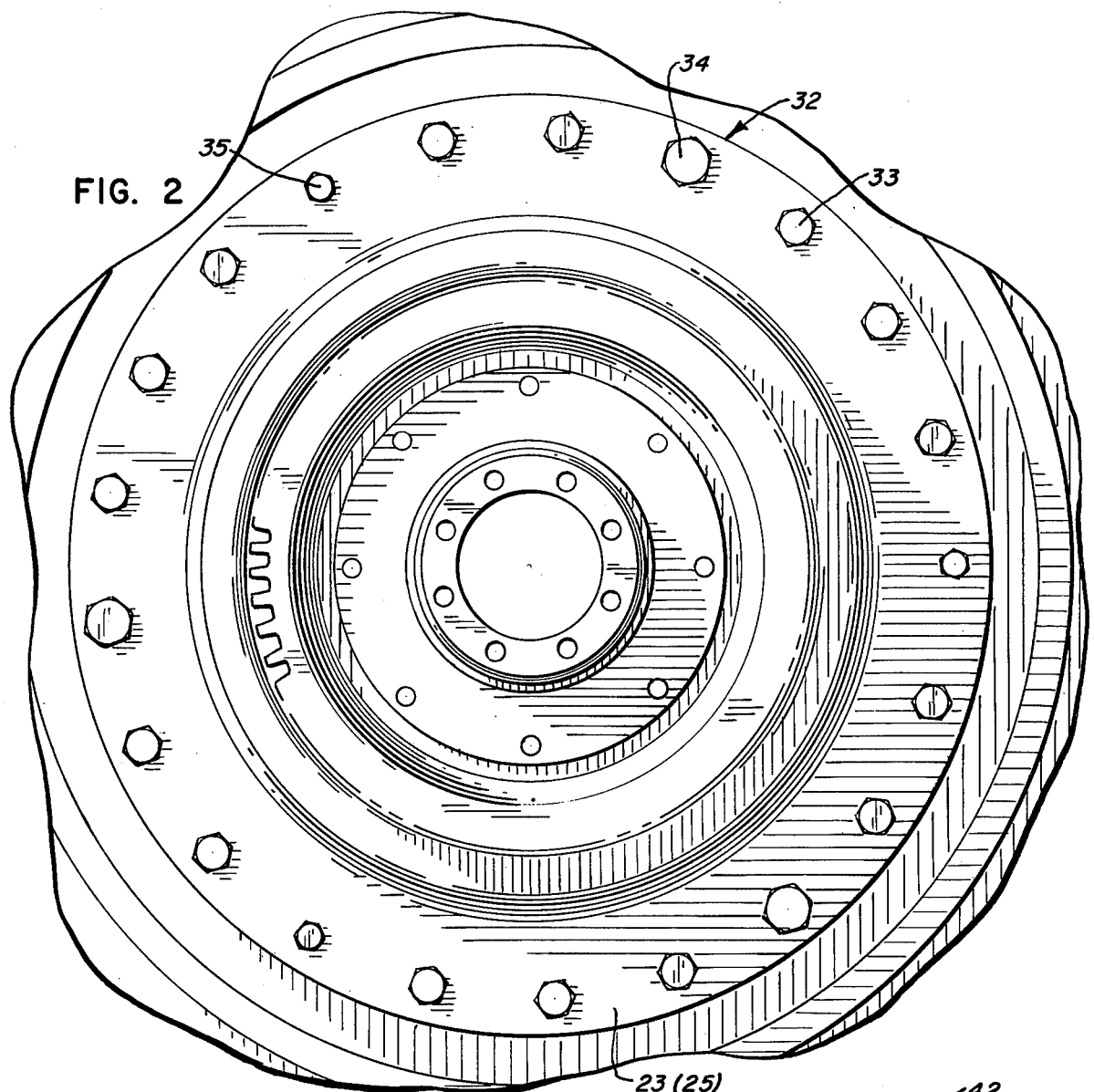
FIG. 2 is an enlarged transverse section thereof.
Figure 3:
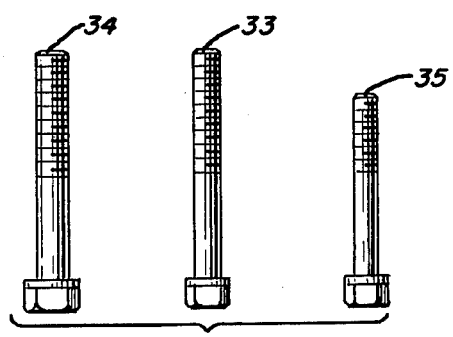
FIG. 3 is a side elevation illustrating the different sizes of bolts utilized in the securing means.

As indicated briefly above, the present invention is concerned with an improved means for securing the retaining rings to the respective wall members to provide a positive secured assembly of the brake and clutch packs in the power drive assembly. As shown in FIGS. 1-3, the means for securing the retaining rings to the wall members herein comprises improved bolt means 32. As shown in FIG. 2, bolt means 32 includes a plurality of first bolts 33, a plurality of second bolts 34, and a plurality of third bolts 35. In the illustrated embodiment, bolts 34 are larger and have a greater strength than bolts 33 and bolts 33 are larger and have a greater strength than bolts 35. Further as shown in FIG. 3, bolts 33 and 34 are of similar lengths whereas bolts 35 have a shorter length. Bolts 33 and 34 are adapted to extend fully freely through suitable bores 35a in the spacer rings 22 and 24 to be threaded to the wall member flanges 30 and 31, respectively. Bolts 35 are adapted to be threaded to the spacer rings and, thus, serve solely to secure the retaining rings 23 and 25 to the respective spacer rings 22 and 24, respectively.

In the illustrated embodiment, the bolt means 32 is defined by 15 bolts 33, 3 bolts 34, and 3 bolts 35. The bolts, as shown in FIG. 2, are arranged in an annular array with an 18° equiangular spacing between the bolts. The large size bolts 34 are spaced apart 120° and the small size bolts 35 are spaced apart 120° intermediate the large bolts 34.

In the illustrated embodiment, bolts 33 comprise ½ inch bolts, bolts 34 comprise ⅝ inch bolts, and bolts 35 comprise ⅜ inch bolts.

The size and strength of bolts 33 and 34 are preselected so that the bolts 34 individually may retain the retaining ring in secured relationship to the associated wall member against the biasing action of the biasing spring. The individual bolts 33 may be smaller and have less strength than bolts 34. However, as there are 15 bolts 33 as compared to only 3 bolts 34, a major portion of the load in securing the retaining ring to the housing wall member is borne by the bolts 33.

The larger size of the bolts 34 provides an indication that the bolts 34 should be the last bolts to remove during disassembly of the power drive. While the three bolts 34 may be loosened concurrently uniformly, it is preferred, within the scope of the invention, that each bolt 34 individually is of sufficient strength to retain the retaining rings 23 or 25 against the action of the biasing spring.

Use of the small bolts 33 further facilitates the assembly by permitting the retaining ring to be preassembled with the spacer ring to alleviate the problem of cocking and jamming of the plates between the retaining ring and spacer ring as has occurred in the prior art arrangement wherein the spacer ring and retainer ring installed as separate elements.

Thus, bolt means 32 provides an improved facilitated securing of the brake pack and clutch pack in the drive assembly 10. Improved safety in the assembly and disassembly is afforded as well as facilitated guiding of the drive components during such assembly and disassembly.

Figure 4:
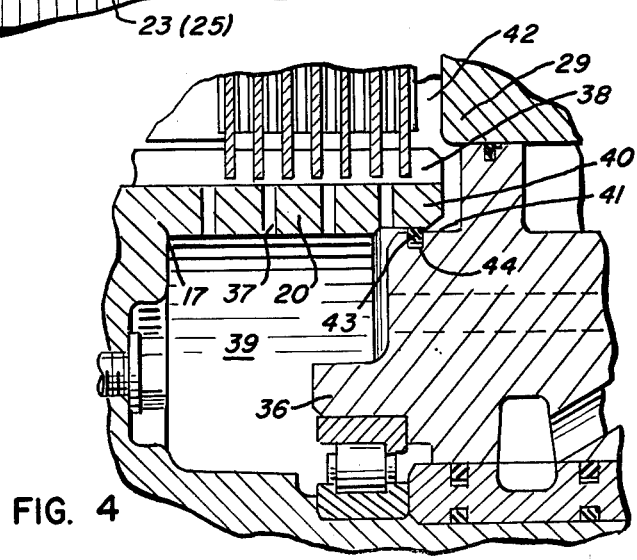
FIG. 4 is a fragmentary enlarged diametric section illustrating in greater detail the improved means for providing coolant lubricant to the pack plates.

As indicated briefly above, the invention further comprehends the provision of improved means for effecting delivery of coolant lubricant to the brake plates and clutch plates of the respective brake pack 12 and clutch pack 11. More specifically, as shown in FIGS. 1 and 4, the brake piston 29 is reciprocally mounted on a cylinder member 36. The carrier end portion 20 (and similarly opposite end portion 18) is provided with a plurality of transfer passages 37 which extend radially outwardly therethrough to open between the circumferentially spaced splines 38 of the carrier end portions. The carrier and cylinder 36 cooperatively define a lubricating oil cavity 39. The distal end 40 of the carrier end portion is spaced radially outwardly of a confronting surface 41 of the cylinder. Heretofore, the space therebetween was arranged to conduct coolant lubricant from the cavity 39 to the pack chamber 42 between the retaining ring and the piston. The present invention comprehends eliminating this means as a flow passage and substituting therefor the positively controlled, relatively large diameter transfer passages 37 to afford a positive optimum bathing of the drive plates in chamber 42 by the pressurized coolant lubricant delivered to cavity 39.

The space between surface 41 and the carrier portion 40 is sealed by means of an annular seal 43 received in a suitable groove 44 in the cylinder 36 and projecting outwardly therefrom in sealing engagement with the carrier portion 40.

Thus, as shown in FIG. 4, the flow of coolant lubricant is directed parallel to the faces of the plates so as to provide an improved cooling lubrication thereof in the operation of the power drive as a result of the radial extent of the transfer passages 37. As shown in FIG. 4, the transfer passages may be distributed in the carrier end portions so as to provide a generally uniform distribution of coolant lubricant to the pack plates. As indicated above, the size of the transfer passages is preferably relatively large so as to assure a positive optimum cooling and lubricating of the brake and clutch packs in use.

The foregoing disclosure of specific embodiments is illustrative of the broad inventive concepts comprehended by the invention.

The embodiments of the invention in which an exclusive property or privilege is claimed are defined as follows:

1. In a power drive assembly having a first wall member, a second wall member, a pack including a plurality of facially engageable plates, and a biasing spring acting between said first wall member and said pack for biasing said plates, improved means for securing said second wall member to said first wall member in an assembled arrangement with said pack and spring disposed therebetween, comprising:
   a plurality of first bolts removably securing the second wall member to the first wall member, said first bolts individually having a strength less than that required to hold the wall members in the assembled arrangement against the biasing action of said spring; and
   a second bolt removably securing said second wall member to said first wall member, said second bolt having a strength substantially greater than that of said first bolts individually and being sufficient to hold the wall members in the assembled arrangement against the biasing action of said spring.

2. The power drive assembly of claim 1 wherein a plurality of bolts similar to said second bolt are provided.

3. The power drive assembly of claim 1 wherein two additional second bolts similar to said second bolt are provided.

4. The power drive assembly of claim 1 wherein two additional second bolts similar to said second bolt are provided, said bolts being arranged in an annular array and said second bolts are spaced 120° apart therein.

5. The power drive assembly of claim 1 wherein a spacer ring is disposed between said wall members for accurately spacing the wall members in the asembled arrangement with the spring accurately stressed to provide the biasing of said plates.

6. The power drive assembly of claim 1 wherein a spacer ring is disposed between said wall members for accurately spacing the wall members in the assembled arrangement with the spring accurately stressed to provide the biasing of said plates, said bolts extending freely through said spacer ring.

7. The power drive assembly of claim 1 wherein a spacer ring is disposed between said wall members for accurately spacing the wall members in the assembled arrangement with the spring accurately stressed to provide the biasing of said plates, said assembly further including a removable securing means for removably securing said second wall member to said spacer ring.

8. The power drive assembly of claim 1 wherein a spacer ring is disposed between said wall members for accurately spacing the wall members in the assembled arrangement with the spring accurately stressed to provide the biasing of said plates, said assembly further including a plurality of third bolts for removably securing said second wall member to said spacer ring.

9. The power drive assembly of claim 1 wherein a spacer ring is disposed between said wall members for accurately spacing the wall members in the assembled arrangement with the spring accurately stressed to provide the biasing of said plates, said assembly further including a plurality of third bolts for removably securing said second wall member to said spacer ring, said third bolts having a strength substantially less than that of said first bolts.

10. The power drive assembly of claim 1 wherein a spacer ring is disposed between said wall members for accurately spacing the wall members in the assembled arrangement with the spring accurately stressed to provide the biasing of said plates, said assembly further including a plurality of third bolts for removably securing said second wall member to said spacer ring, said first, second and third bolts being disposed in a single annular bolt array.

11. The power drive assembly of claim 1 wherein a spacer ring is disposed between said wall members for accurately spacing the wall members in the assembled arrangement with the spring accurately stressed to provide the biasing of said plates, said assembly further including a plurality of third bolts for removably securing said second wall member to said spacer ring, said first, second and third bolts being disposed in a single annular bolt array, there being three said second bolts spaced 120° apart in said array and three said third bolts spaced 120° apart and intermediate said second bolts in said array.

12. The power drive assembly of claim 1 wherein a spacer ring is disposed between said wall members for accurately spacing the wall members in the assembled arrangement with the spring accurately stressed to provide the biasing of said plates, said assembly further including a plurality of third bolts for removably securing said second wall member to said spacer ring, said first, second and third bolts being disposed in a single annular bolt array wherein the bolts are spaced apart 18°, there being 15 of said first bolts, three of said second bolts, and three of said third bolts.

* * * * *